July 10, 1962 C. C. RYAN, JR 3,044,055
AUTOMATIC ACQUISITION GUN TURRET SYSTEM
Filed June 29, 1956 2 Sheets-Sheet 1
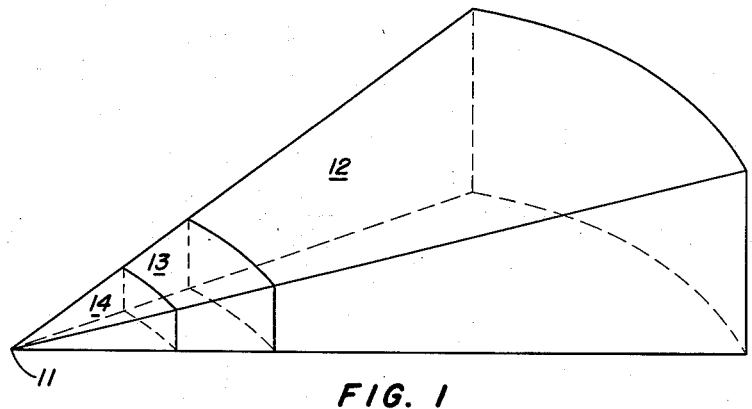
FIG. 1
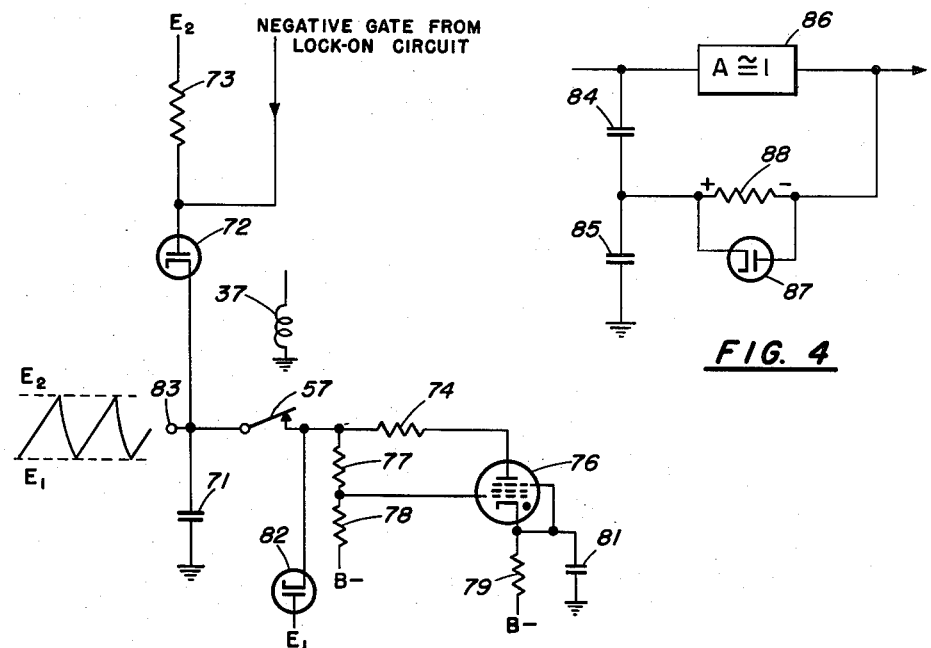
FIG. 3
FIG. 4
INVENTOR
CHARLES C. RYAN, JR.
BY
ATTORNEYS

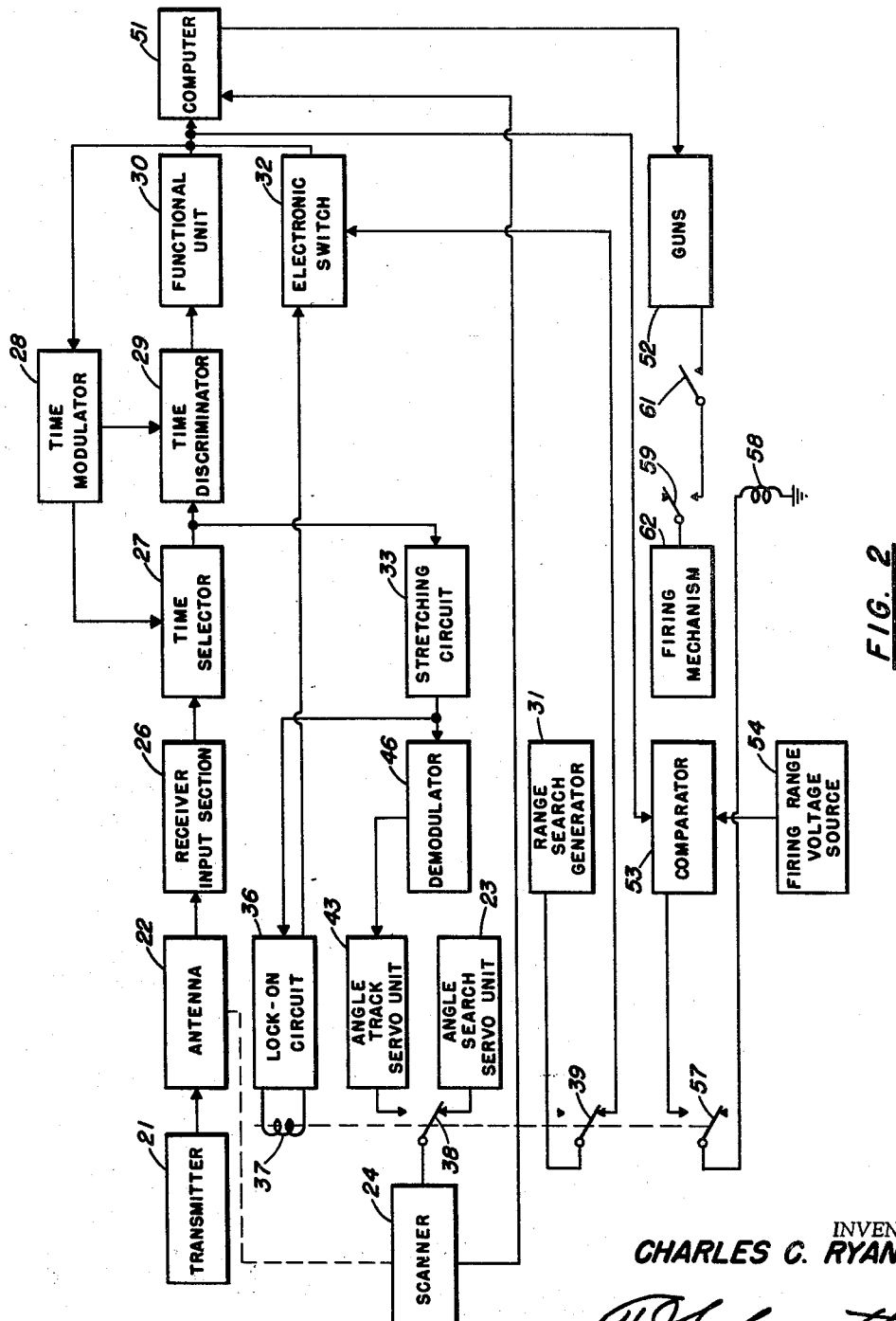

United States Patent Office 3,044,055
Patented July 10, 1962

3,044,055
AUTOMATIC ACQUISITION GUN TURRET SYSTEM
Charles C. Ryan, Jr., Glen Burnie, Md., assignor, by mesne assignments, to the United States of America as represented by the Secretary of the Navy
Filed June 29, 1956, Ser. No. 595,017
2 Claims. (Cl. 343—7)

The present invention relates to gun control systems and more particularly to gun control systems especially adapted for use in aircraft having radar equipment.

An aircraft gun control system protects the craft to which it belongs from an attack by enemy aircraft in the region covered by the particular guns. For example, a tail turret system protects the aircraft from a tail attack. In using a prior art tail turret system, the operator places radar equipment on an approaching enemy aircraft when it appears in the tail region. The radar equipment then tracks the enemy aircraft as it closes in range. The output from the radar equipment is utilized to train the turret guns on the target so that when the latter is within firing range the operator can fire and hit the target. The effectiveness of this system depends entirely upon the alertness and ability of the operator, the quality and the type of equipment, and the nature of the attack.

In an effort to relieve the operator of extremely rapid response times when he sights a target on the radar oscilloscope, radar ranges are made in the order of five or six times greater than the aircraft firing range. This long range gives the operator ample time to set his system up on the pursuing enemy craft. However, if the operator takes advantage of this fact, he may very well set his system on a target that does not continue pursuit; i.e., a decoy. On the other hand, if he waits too long in an effort to continue his search, he may not set his system up on the target in time if the enemy really intends to close in. The purpose of the present invention is to relieve the operator of this responsibility.

In the design of the present invention, the following philosophy had been adopted: In the case of an aircraft tail turret system, if an enemy aircraft is off the tail and beyond a certain preselected range, as long as it remains beyond this range the enemy can do the protected aircraft no harm. If the enemy aircraft closes within this selected range it becomes a potential danger. On the basis of this philosophy the present invention has been designed to neglect any target that exists beyond the selected range and to automatically lock-on and track in and fire upon any target that comes within this range.

The essential elements of the present system include a range search signal generator which causes the range track circuitry (normally unused in a radar search) of a radar system to sweep between two limits, one of which is the upper limit of the firing range, and the other of which is a selected range which is determined by the anticipated tactical approach. The region between the two ranges is kept as small as possible to ensure fast acquisition. A target appearing within this region acts through the radar system to automatically stop the radar antenna and to change the system's mode from search to track. Then, the target is tracked in the usual manner to within firing range and fired upon.

Accordingly, an object of the present invention is the provision of a gun control system that is automatic in operation.

Another object is to provide an automatic acquisition gun turret system which automatically seeks out and locks on a target when the target is within a selected range.

A further object of the invention is the provision of a system for the operation of a gun turret on an aircraft that has a radar system which detects and locks on any target within a preselected range of the aircraft and causes the turret guns to be aimed at the target within the preselected range and to fire when the target is within firing range.

Other objects and many of the attendant advantages of this invention will be readily appreciated as the same becomes better understood by reference to the following detailed description when considered in connection with the accompanying drawings wherein:

FIG. 1 shows an outline of the search and track region of a typical system,

FIG. 2 illustrates a block diagram of a preferred embodiment of the present invention, FIG. 3 is a circuit diagram of an electronic switch and range search generator that could be used in the embodiment of FIG. 2, and FIG. 4 is a diagram of a functional unit that can be employed in the range tracking loop of the embodiment of FIG. 2.

Referring now to the drawings, there is shown in FIG. 1 an outline of the search and track region of a typical gun fire control system. Point 11 of this figure is a point on the protected aircraft; e.g., the tail. The combined regions 12 and 13 of this outline are the spaces normally required by the operator of the gun control system to detect and cause the radar system to lock on an approaching enemy aircraft. Region 14 is the firing region within which the operator fires the guns upon the enemy aircraft. For the present invention, region 12 is not required. Region 13, the automatic acquisition region, is continually being searched in range, azimuth and elevation by the radar system of the present invention. Region 14 remains the fire power region of the turret system.

In the preferred embodiment of the present invention disclosed in FIG. 2, a transmitter 21, such as a magnetron system, feeds high frequency pulses to antenna 22 for propagation from the aircraft. The antenna is driven by angle search servo unit 23 by means of scanner 24 in a searching fashion which may be a Palmer, modified Palmer, spiral, etc., search pattern. Regardless of the type pattern, all points in the elevation and azimuth co-ordinates that fall within the outer extremities of the pattern are "search lighted" at least once during one scan cycle. Therefore, if a target exists within the extremities of the search pattern which includes regions 12, 13 and 14, of FIG. 1, a packet of pulses is returned to antenna 22 as the scanning beam passes by the target. These received pulses are processed by receiver input section 26, which includes the mixer, local oscillator, video amplifier, etc., and conducted to the range tracking loop. This loop may be of almost any type and as shown includes time selector 27, time modulator 28, time discriminator 29 and functional unit 30, with a first output terminal after the functional unit and a second terminal between the time selector and time discriminator. Time selector 27 passes the signal from receiver input section 26 when this signal is obtained from pulses reflected from a target within regions 13 and 14 of the FIG. 1 outline. This result is accomplished in part by means of a signal from range search generator 31, which is fed via electronic switch 32 to time modulator 28 and therein sweeps a gate produced by time modulator 28 between two limits corresponding to the limits of region 13 of FIG. 1. If at the same time the scanning beam from antenna 22 passes by a target, a sweeping range gate from time modulator 28 becomes coincident with the target in range, time selector 27 passes the pulses from the receiver input section 26 to stretching circuit 33. Stretching circuit 33 increases the time duration of these pulses over several pulse repetition periods and provides an output suitable for operation of lock-on circuit 36. Upon being energized by lock-on circuit 36, relay 37 disconnects the angle search servo unit 23 by means of switch 38 and range search generator 31 by means of switch 39. Simultaneously with the operation of relay 37, lock-on circuit 36 generates a pulse to shut off electronic switch 32. Also, substantially simultaneously with the operation of lock-on circuit 36, demodulator 46 demodulates the stretched pulses from stretching circuit 33 and feeds the demodulated pulses to angle track servo unit 43 which has been previously joined by switch 38 to scanner 24. Under control of angle track servo unit 43, scanner 24 directs antenna 22 to maintain the antenna beam upon the target when the target is in regions 13 and 14 of FIG. 1.

Referring now to the aiming and firing portion of the present invention shown in FIG. 2, computer 51 utilizes range signals from the tracking loop and azimuth-elevation signals from scanner 24 for controlling the gun aiming angles of guns 52 so that the target is hit when these guns are fired. The firing of these guns is accomplished by means of a signal conducted from the range tracking loop to comparator 53, which compares this signal with a signal from the firing range voltage source 54. When the tracking loop range signal corresponds to a target range in region 14 of FIG. 1, comparator 53 produces an output which is conducted through switch 57, which has been previously closed by the action of relay 37, to energize coil 58. The energization of coil 58 closes switch 59, and if safety switch 61 is closed, a signal from firing mechanism 62 travels through switches 59 and 61 to fire guns 52. Thus, a target in region 14 of FIG. 1 is fired upon.

FIG. 3 illustrates a circuit suitable for the range search generator 31 and the electronic switch 32 of FIG. 2. In this circuit capacitor 71 charges up through normally-conducting diode 72 and through resistor 73 towards the voltage B—. Capacitor 71 discharges through fired thyratron 71 is conducted through switch 57 and resistor 74 to the plate of thyratron 76. This increase of voltage also affects the grid of this thyratron through the voltage dividing arrangement of resistors 77 and 78, and thus thyratron 76 is fired when the voltage on capacitor 71 attains a certain level. This firing level is determined by the magnitudes of voltage dividing resistors 77 and 78 and the voltage B-. Capacitor 71 discharges through fired thyratron 76 and continues discharging until the thyratron plate voltage is lower than the cathode voltage. The latter voltage is determined in part by resistor 79 and capacitor 81. Capacitor 71 then commences charging again. A clamping source $E_1$ acts to ensure that the voltage on capacitor 71 does not decrease below $E_1$. $E_1$ and $E_2$ are, of course, the two voltage extremes corresponding to the inner and outer boundaries, respectively, of region 13 of the FIG. 1 outline. The saw-tooth voltage generated at terminal 83 by the charging and discharging of capacitor 71 is fed to time modulator 28 shown in FIG. 2, and sweeps the range gate in region 13 of FIG. 1. When the radar system of the present invention "sights" a target in region 13, the system switches from sweep to track and the negative gate from lock-on circuit 36 cuts off diode 72 and relay 37 opens up switch 57 to isolate capacitor 71 from the various voltage sources.

Clutter in the present system can be avoided through the use of a functional system such as that shown in FIG. 4 which could be employed for the element 30 of FIG. 2. This functional unit comprising capacitors 84 and 85, amplifier 86, and resistor 88, is conventional with the exception that a diode 87 has been placed in parallel with resistor 88. Any clutter resembling a target, e.g., cloud returns, has a negative closing velocity; i.e., moves away from the plane. For a closing target, the polarity of the rate of voltage across resistor 88 is that as shown and for an opening target, i.e., a negative closing target, the polarity is reversed. Diode 87 has a polarity such that it conducts for opening targets and thus they are rejected even if they are within region 13 of FIG. 1. For closing targets, the polarity of the voltage across diode 87 prevents conduction and the closing target signal is passed on to stop the search and to initiate a tracking operation.

Although only three of the components shown in the preferred embodiment of FIG. 2 have been disclosed in detail, a person skilled in the radar art can construct the present invention since there are well-known circuits for performing the functions of each of the components of the FIG. 2 embodiment. For example, Patent No. 2,617,982, entitled "Radio Gun Control System," and granted on November 11, 1952, to C. G. Holschuh et al., has either circuit diagrams of or references to specific showings of circuits suitable for many of the components of the FIG. 2 embodiment of the present invention. Other components are disclosed in Patent No. 2,709,804, entitled "Automatic Range and Azimuth Tracking System," granted on May 31, 1955, to B. Chance et al. Of course, these components also can be found in text books such as Principles of Radar, Second Edition, Radar School, Massachusetts Institute of Technology, McGraw-Hill, 1946.

To sum up, a system has been shown utilizable with an aircraft or the like to detect targets within the vicinity of the aircraft. However, the system does not track all detected targets but only those that are a real threat. When the target comes within firing range, the guns are automatically fired, if desired, or can be operated by hand. This system removes much of the operator's burden and also is more decoy-proof than the prior systems.

Obviously many modifications and variations of the present invention are possible in the light of the above teachings. It is therefore to be understood that within the scope of the appended claims the invention may be practiced otherwise than as specifically described.

What is claimed is:

1. An automatic acquisition system operable with the radar system of an aircraft for controlling the aiming and firing of the aircraft guns, said automatic acquisition system comprising: an antenna, a transmitter for energizing said antenna, a receiver input section connected to said antenna for receiving and processing a target echo video signal, a range tracking loop connected to said receiver input section having first and second output terminals, said range tracking loop operable to produce a target range voltage at said first output terminal, a range search generator for producing a varying voltage, first means included in said range tracking loop responsive to said varying voltage for producing a sweeping gate signal, second means included in said range tracking loop responsive to said sweeping gate signal for passing said video signal into said range tracking loop to said second output terminal, a scanner for controlling the movement of said antenna, an angle search servo unit for energizing said scanner to move said antenna through a pre-selected search pattern, an angle track servo unit, switching means responsive to said video signal on said second output terminal for disconnecting said angle search servo unit from said scanner and said range search generator from said first means and simultaneously connecting said angle track servo unit to said scanner, said angle track servo uit operable in response to said video signal at said second terminal to lock said antenna on a target, a computer connected to said first output terminal of said range tracking loop responsive to said target range voltage and to said antenna position for controlling the aircraft guns to train on said target being tracked, comparison means responsive to said target range voltage and an internally generated range signal operable to fire on the target when in firing range, and diode means included in said range loop operable in conjunction with said first means to inhibit the passage of said video signal through said second means when said target lacks a closing velocity.

2. An automatic acquisition turret system for controlling the operation of an aircraft gun, said system comprising: a radar antenna, a transmitter connected to said antenna for transmitting radar pulses, a receiver unit connected to said antenna for processing received echo pulses, a range tracking loop connected to said receiver unit having first and second output terminals and comprising means for producing a sweeping range gate signal and gating means response to said gate signal and said echo pulses for passing said echo pulses to said second output terminal, said range tracking loop operable to produce a target range voltage at said first output terminal, a scanner responsive to an input signal to cause a scanning movement of said antenna, means for feeding a periodically varying voltage to said scanner for producing a pre-selected search pattern of the signals radiated from said antenna, means responsive to the incidence of an echo pulse at said second output terminal for stopping the production of said sweeping range gate signal and for converting the operation of said scanner from a search mode to a tracking mode such that the radiated signal from said antenna is locked on said target, a computer connected to said first output terminal of said tracking loop and responsive to said target range voltage and the position of said antenna for training the aircraft guns on the target from which the echo pulses are reflected, means responsive to the voltage on said first terminal for firing said guns when said target is within firing range, and means included in said tracking loop responsive to said target range voltage to prevent further incidence of echo pulses at said second output terminal when said target fails to possess a closing velocity.

References Cited in the file of this patent

UNITED STATES PATENTS

| | | |
|---|---|---|
| 2,440,609 | Keizer | Apr. 27, 1948 |
| 2,505,549 | Jones | Apr. 25, 1950 |
| 2,677,758 | Robinson et al. | May 4, 1954 |
| 2,737,652 | White et al. | Mar. 6, 1956 |

UNITED STATES PATENT OFFICE
CERTIFICATE OF CORRECTION

Patent No. 3,044,055                          July 10, 1962

Charles C. Ryan, Jr.

It is hereby certified that error appears in the above numbered patent requiring correction and that the said Letters Patent should read as corrected below.

Column 3, line 35, for "B-. Capacitor 71 discharges through fired thyra-" read -- $E_2$. The resulting increase of voltage on capacitor --; column 4, line 61, for "uit" read -- unit --.

Signed and sealed this 30th day of October 1962.

(SEAL)
Attest:

ERNEST W. SWIDER
Attesting Officer

DAVID L. LADD
Commissioner of Patents